(12) United States Patent
Nguyen

(10) Patent No.: US 12,099,549 B2
(45) Date of Patent: **\*Sep. 24, 2024**

(54) AUTOMATED FIELD PLACEMENT FOR UPLOADED DOCUMENTS

(71) Applicant: ZenPayroll, Inc., San Francisco, CA (US)

(72) Inventor: Minh Quan Dang Nguyen, San Jose, CA (US)

(73) Assignee: ZENPAYROLL, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,482

(22) Filed: Oct. 5, 2023

(65) Prior Publication Data
US 2024/0028643 A1 Jan. 25, 2024

Related U.S. Application Data

(63) Continuation of application No. 17/743,266, filed on May 12, 2022, now Pat. No. 11,816,155, which is a
(Continued)

(51) Int. Cl.
*G06F 16/84* (2019.01)
*G06F 16/838* (2019.01)
(Continued)

(52) U.S. Cl.
CPC ............ *G06F 16/84* (2019.01); *G06F 16/838* (2019.01); *G06F 40/174* (2020.01); *G06F 40/30* (2020.01)

(58) Field of Classification Search
CPC ........ G06F 16/84; G06F 16/838; G06F 40/30; G06F 40/174
See application file for complete search history.

(56) References Cited

U.S. PATENT DOCUMENTS 7,451,392 B1 * 11/2008 Chalecki ................. G06F 16/33
715/224
8,930,400 B2 * 1/2015 Adamic .................. G06F 16/31
707/706
(Continued)

OTHER PUBLICATIONS

United States Office Action, U.S. Appl. No. 16/780,789, filed Jan. 19, 2022, 10 pages.
(Continued)

*Primary Examiner* — Scott T Baderman
*Assistant Examiner* — Mario M Velez-Lopez
(74) *Attorney, Agent, or Firm* — Fenwick & West LLP

(57) ABSTRACT

Users of a database management engine may generate fillable digital documents by mapping interface elements onto form documents. When a user maps interface elements onto a form document, the user may accidentally overlap two or more interface elements. To rectify this, the database management engine may modify the position of one of interface elements based on a set of positioning rules. In addition, the database management engine may identify and suggest mappings to users based on similar documents that have been previously mapped. The database management engine identifies similar documents using information about the document, the user, and the mapping itself. The mapping associated with the most similar document may be provided to the user as a suggested mapping. The database management engine converts the form document and finalized mapping into a fillable digital document. The fillable digital document is sent to recipients, who complete the fillable digital document.

18 Claims, 10 Drawing Sheets

Related U.S. Application Data continuation of application No. 16/780,789, filed on Feb. 3, 2020, now Pat. No. 11,361,025.

(51) Int. Cl.
*G06F 40/174* (2020.01)
*G06F 40/30* (2020.01)

(56) References Cited

U.S. PATENT DOCUMENTS

| | | | |
|---|---|---|---|
| 9,594,740 B1 | 3/2017 | Reddy | |
| 9,864,492 B2 | 1/2018 | Peng | |
| 10,671,806 B2* | 6/2020 | Tsabba | G06F 40/154 |
| 11,087,079 B1 | 8/2021 | Nguyen et al. | |
| 11,886,802 B2* | 1/2024 | Magdziarz | G06F 16/338 |
| 2002/0141660 A1 | 10/2002 | Bellavita et al. | |
| 2007/0256005 A1* | 11/2007 | Schneider | G06F 40/134 |
| 2008/0195586 A1* | 8/2008 | Arnold | G06F 16/951 |
| 2008/0244384 A1* | 10/2008 | Yoshitani | G06F 16/5854 |
| | | | 715/251 |
| 2008/0313529 A1* | 12/2008 | Gwozdz | G06F 40/174 |
| | | | 715/224 |
| 2011/0119574 A1* | 5/2011 | Rogers | G06F 40/18 |
| | | | 715/239 |
| 2011/0238650 A1* | 9/2011 | Jenkins | G06Q 10/063 |
| | | | 707/706 |
| 2014/0173422 A1* | 6/2014 | Stone | G06V 30/412 |
| | | | 715/244 |
| 2014/0380141 A1 | 12/2014 | Craven et al. | |
| 2015/0095337 A1* | 4/2015 | Knight | G06N 7/01 |
| | | | 707/737 |
| 2016/0162480 A1* | 6/2016 | Schaerges | G06F 16/214 |
| | | | 707/756 |
| 2017/0286389 A1* | 10/2017 | Ceneviva | G06F 40/106 |
| 2018/0067957 A1* | 3/2018 | Paterson | G06F 40/114 |
| 2019/0065455 A1* | 2/2019 | Dua | G06F 40/143 |
| 2020/0074169 A1* | 3/2020 | Mukhopadhyay | G06F 18/22 |
| 2020/0097714 A1* | 3/2020 | Moghtadai | G06Q 30/0206 |
| 2020/0110792 A1* | 4/2020 | Tsabba | G06F 3/167 |
| 2020/0234003 A1 | 7/2020 | Bakman | |
| 2021/0240766 A1 | 8/2021 | Nguyen | |
| 2023/0062227 A1* | 3/2023 | Davis | G06F 16/13 |
| 2023/0161952 A1* | 5/2023 | Garimella | G06N 3/08 |
| | | | 715/224 |

OTHER PUBLICATIONS

United States Office Action, U.S. Appl. No. 17/743,266, filed Mar. 24, 2023, 12 pages.

United States Office Action, U.S. Appl. No. 17/743,266, filed Jan. 27, 2023, 12 pages.

United States Office Action, U.S. Appl. No. 17/743,266, filed Dec. 16, 2022, 12 pages.

United States Office Action, U.S. Appl. No. 17/743,266, filed Nov. 10, 2022, 24 pages.

* cited by examiner

Documents > Upload Documents
Upload Document

1. Document Details 300  2. Map Document  3. Preview  4. Send to Employees

Requested Category 315 ← 309
Filled by the recipient

- ✎ Signature 325
- + Text 330
- Initials 335
- ☑ Checkbox 340

Admin Categories

- Admin Signature 345
- Admin Title 350
- Admin Full Name 355

Automatic Categories 320
Autofilled based on existing information

- Date 360
- Company Name 365

Form A-A Wage Statement 2019   Department of the Treasury
Photocopies are not acceptable   For Privacy Act, see instructions a. Employee's SSN | Employee: | Retired:
b. Employee Identification Number 310 | 1. Wages, Tips | 2. Federal Income Tax
c. Employer's name, address, and ZIP code | d. Employee's address and ZIP code |
e. Employee's First Name | f. Employee's Last Name | g. Signature | h. Date Do Not Cut, Fold or Staple Forms on This Page

311

305

370 — Save & Continue    Back — 375

FIG. 3

Documents > Upload Documents
Upload Document

1. Document Details — 2. Map Document 400 — 3. Preview — 4. Send to Employees — 410

| a. Employee's SSN | Employee: ◉   Retired: ◉ | |
|---|---|---|
| b. Employee Identification Number | 1. Wages, Tips | 2. Federal Income Tax |
| c. Employer's name, address, and ZIP code | d. Employee's address and ZIP code 425<br>Address line 1<br>City 415 | |
| e. Employee's First Name | f. Employee's Last Name | g. Signature | h. Date |

Form A-A Wage Statement  2019  Department of the Treasury
Photocopies are not acceptable  For Privacy Act, see instructions Do Not Cut, Fold or Staple Forms on This Page (Save & Continue)  (Back)

405

Requested Categories
Filled by the recipient

✎ Signature
+ Text
Initials
☑ Checkbox

Admin Categories

Admin Signature
Admin Title
Admin Full Name

Automatic Categories
Autofilled based on existing information

Date
Company Name

FIG. 4A

Documents > Upload Documents
Upload Document

1. Document Details    2. Map Document 400    3. Preview    4. Send to Employees

| a. Employee's SSN | Employee: ◉   Retired: ◉ | |
|---|---|---|
| b. Employee Identification Number | 1. Wages, Tips | 2. Federal Income Tax |
| c. Employer's name, address, and ZIP code | d. Employee's address and ZIP code 425<br>Address Line 1 — 420<br>City — 415 | |
| e. Employee's First Name | f. Employee's Last Name | g. Signature    h. Date |

Form A-A Wage Statement    2019    Department of the Treasury
Photocopies are not acceptable    For Privacy Act, see instructions Do Not Cut, Fold or Staple Forms on This Page

405 →

Requested Categories
Filled by the recipient

- ✎ Signature
- + Text
- Initials
- ☐ Checkbox

Admin Categories

- Admin Signature
- Admin Title
- Admin Full Name

Automatic Categories
Autofilled based on existing information

- Date
- Company Name ( Save & Continue )    ( Back )

FIG. 4B

Documents > Upload Documents
Upload Document

1. Document Details    2. Map Document    3. Preview    4. Send to Employees

Recipients 600

Sort By: Department | Filters ▼

- ◉ Select All 610
- ◉ Employee A
- ◉ Employee B
- ◉ Employee C
- ◉ Employee D — 605

Submit — 615

620

Back

Save & Continue

FIG. 6

Documents > Upload Documents
Upload Document 800

1. Document Details

You're uploaded document appears to be a:
Form A-A Wage Document

Based on similar documents, we generated a suggested mapping.

To proceed with the suggested mapping, click 'Proceed'
To continue mapping without suggestions, click 'Cancel'

805 — Proceed   Cancel — 810

Back

Save & Continue

FIG. 8

Documents > Upload Documents

Upload Document

1. Document Details    2. Map Document    3. Preview    4. Send to Employees

Requested Categories
Filled by the recipient

- ✎ Signature
- + Text
- Initials
- ☐ Checkbox

Admin Categories

- Admin Signature
- Admin Title
- Admin Full Name

Automatic Categories
Autofilled based on existing information

- Date
- Company Name

Employee: ◯   Retired: ◯ a. Employee's SSN
[SSN]

b. Employee Identification Number
[EIN]

1. Wages, Tips
[Text]

2. Federal Income Tax
[Text]

c. Employer's name, address, and ZIP code
[Company Name]
[Address Line 1]
[City] [State] [ZIP]

d. Employee's address and ZIP code
[Address Line 1]
[City] [State] [ZIP]

e. Employee's First Name
[Employee First Name]

f. Employee's Last Name
[Employee Last Name]

g. Signature
[Signature]

h. Date
[Date]

Form A-A Wage Statement   2019 Department of the Treasury
Photocopies are not acceptable    For Privacy Act, see instructions Do Not Cut, Fold or Staple Forms on This Page

[ Save & Continue ]    [ Back ]

FIG. 9

AUTOMATED FIELD PLACEMENT FOR UPLOADED DOCUMENTS

CROSS REFERENCE TO RELATED APPLICATIONS

This application is a continuation of U.S. application Ser. No. 17/743,266, filed May 12, 2022, now U.S. Pat. No. 11,816,155, which is a continuation of U.S. application Ser. No. 16/780,789, filed Feb. 3, 2020, now U.S. Pat. No. 11,361,025, all of which is incorporated by reference in their entirety.

BACKGROUND

This description generally relates to database management engines and specifically to generating fillable digital documents based on user mappings of form documents.

In current systems, when a user generates a fillable digital document, recipient input is often limited to acknowledgement and signing. In systems that allow a wider range of recipient input, users must often rely on external systems to carry out mappings or manually reposition interface elements that have been incorrectly mapped onto a document. Manual repositioning may be inefficient for users. For example, manual repositioning is often linked with increased labor costs, which customers are expected to absorb. Further, incorrectly mapped documents may cause confusion and data entry errors among recipients. For example, it may cause data entry problems for a recipient of a fillable digital document when the recipient attempts to enter data into a partially covered interface element. This may result in lost data collection opportunities.

SUMMARY

Users of a database management engine may generate fillable digital documents by mapping interface elements onto form documents. Mapping interface elements is a process in which a user adds one or more interface elements to various locations throughout the form document. Users may map interface elements by dragging and dropping interface elements from an interface element portion of a user interface into the document. Interface elements are each associated with a category and position, and are configured to allow a recipient of the fillable digital document to input data at the position associated with the interface element.

When a user maps interface elements onto a form document, the user may accidentally overlap two or more interface elements. This may cause recipient confusion and decreased usability of the generated fillable digital document. For example, this can cause data entry problems for the recipient of the fillable digital document when the recipient attempts to enter data into a partially covered interface element.

To rectify this problem, the user database management engine detects collisions between interface elements that have been mapped onto a form document. In response to detecting a collision, the database management engine may modify the position of one or more of the effected interface elements. The database management engine may modify the position of the one or more effected interface elements based on a set of predetermined rules. Example rules include modifying the position of the interface element such that it is located at the shortest possible distance from its original location, modifying the position of the interface elements in a particular order relative to the form document (e.g., left to right and/or top to bottom), modifying the position based on a semantic analysis of the categories associated with the interface elements, modifying the position based on an optimization analysis performed on the position of the interface elements, and the like.

In addition, the database management engine may identify and suggest mappings to users based on similar documents that have been previously mapped. The database management engine may identify similar documents based on information about the document, the user that mapped the document, and the mapping itself. The mapping associated with the most similar document may be provided to the user as a suggested mapping. Alternatively, or additionally, the database management engine may generate and suggest an optimized mapping based on one or more similar documents, data associated with the user of the form document, data associated with the users of the similar documents, and the like. Once a suggested mapping has been provided, the user may elect to use the mapping via a user interface. The user may also add, edit, and/or remove interface elements of the suggested mapping.

The database management engine converts the form document and the finalized mapping into a fillable digital document. The fillable digital document may then be sent to recipients, who may complete the fillable digital document on a user interface of the database management engine.

THE BRIEF DESCRIPTION OF THE DRAWINGS

FIG. 3 is an example interface for uploading documents, according to one embodiment.

FIGS. 4A-4B illustrates an example process of collision detection, according to one embodiment.

FIG. 6 illustrates an example recipient user interface, according to one embodiment.

FIG. 8 illustrates a suggested mapping prompt, according to one embodiment.

FIG. 9 illustrates a suggested mapping user interface, according to one embodiment.

The figures depict various example embodiments of the present technology for purposes of illustration only. One skilled in the art will readily recognize from the following description that other alternative embodiments of the structures and methods illustrated herein may be employed without departing from the principles of the technology described herein.

DETAILED DESCRIPTION

System Overview

Figure 1:
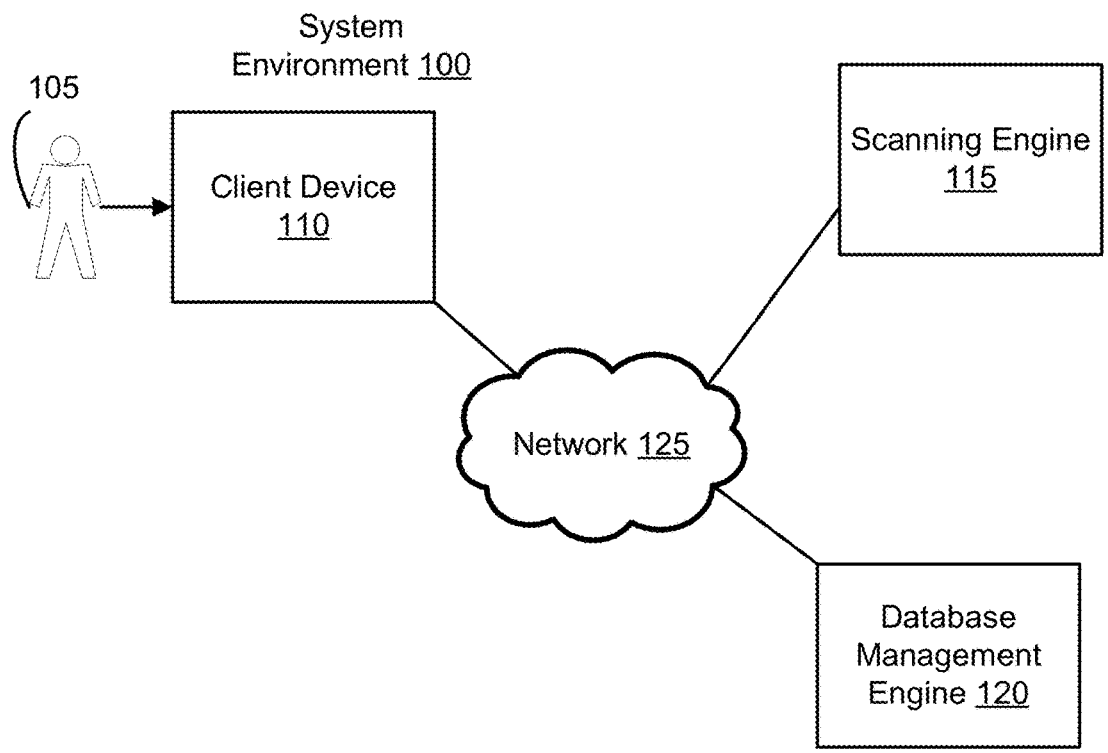
FIG. 1 illustrates a diagram of a system environment of a database management engine, according to one embodiment.

FIG. 1 illustrates a diagram of a system environment 100 of a database management engine 120, according to one embodiment. The system environment 100 shown in FIG. 1 includes a user 105, a client device 110 of the user 105, a scanning engine 115, the database management engine 120, and a network 125. In alternative configurations, different and/or additional components may be included in the system environment 100.

A user 105 of the database management engine 120 is an individual or entity associated with an organization. Organizations may include schools or universities, businesses, non-profits, government agencies, and the like. Each organization has one or more employees. A user 105 can use the database management engine 120 to manage employee information, in particular to manage forms of the employee.

The client device 110 is one or more computing devices capable of receiving user input as well as transmitting and/or receiving data via a network 125. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via a network 125. In one embodiment, a client device 110 executes an application allowing a user of the client device 110 to interact with the database management engine 120. For example, a client device 110 executes a browser application or native application to enable interaction between the client device 110 and the database management engine 120 via a network 125. In another embodiment, a client device 110 interacts with the database management engine 120 through an application programming interface (API) running on a native operating system of the client device 110, such as IOS® or ANDROID™.

The scanning engine 115 is a third-party system that detects and extracts text from images. The scanning engine 115 may extract text from bounding boxes within the images as single strings, words, blocks, and/or paragraphs. The scanning engine 115 may also provide the position of each bounding box within the image. For example, the position of each bounding box may be relative to an origin of the image (e.g., a top left corner, image center, etc.), relative to the margins of the image, or relative to other bounding boxes within the image. In some embodiments, a set of coordinates describing a perimeter of each bounding box is provided to the user 105. In other embodiments, coordinates describe one or more corners of the bounding box, a side of the bounding box, or any appropriate bounding box locus. The scanning engine 115 may also extract text from form documents as a grid. For example, the scanning engine 115 may segment a form document into an n-dimensional grid and identify the location of each string, word, etc., relative to its location within the grid. It should be noted that in some embodiments, the scanning engine 115 or software with similar functionality to the scanning engine may be integrated into the database management engine 120.

The database management engine 120 provides users of the database management engine 120 methods of generating fillable digital documents from form documents. Form documents often include a set of fields, where each field is associated with a field type (e.g., name, location, social security number, etc.) and field position. Fields may also include an empty space in which a recipient of the form document may enter data corresponding to the field type (e.g., text, a signature, date, etc.). Because form documents are often provided in a format that recipients cannot easily add text to (e.g., pdf, png, jpg formats), the database management engine 120 provides users with a method of generating forms that are configured to be completed digitally, i.e., fillable digital documents. To do this, the database management engine 120 provides users with a set of interface elements to overlay onto an image of a form document. Users may overlay interface elements by dragging and dropping them onto the image of the form document.

The set of interface elements, when overlaid onto an image of a form document, is referred to as a "mapping". The mapping of the set of interface elements onto the image of the form document can, for each interface element within the set of interface elements, include the position of the interface element relative to the image of the form document and the category of the field to which the interface element corresponds. The position of each interface element demarcates an area of the fillable digital document in which a recipient is able to digitally enter data. The image of the form document and set of interface elements overlaid onto the image of the form document are saved and converted into a fillable digital document. The fillable digital document is sent to recipients (e.g., additional users of the database management engine 120) who may complete the document by digitally entering data using an interface of the database management engine.

A category of an interface element may be data-specific, such as an interface element for a name, address, company name, or employment status. A category of an interface element may also be generic, such as an interface element for a selection box (e.g., a checkbox or radio button), entered text, and the like. Further, an interface element may be a requested category or an automatic category. Requested categories require user input from the recipient of the fillable digital document, such as entering text or checking a box. Automatic categories are categories that are automatically completed using known information of the recipient, such as information stored in a user profile of the database management engine 120.

Categories may be correlated with common field types (e.g., name, location, company, etc.). Therefore, users may overlay interface elements based on a correlation between the category of the interface element and the field type of the document field. For example, a user may place a name interface element in the empty space of a name field to prompt a recipient of the fillable digital document to digitally enter their name into the name field. Further, to account for variations in the size, shape, and location of document fields, the size and shape of interface elements may be modified to fit the within the space of a document field. This helps ensure that interface elements and/or the data configured to be entered into the fillable digital document does not overlap with field text. Additionally, interface elements may be placed at locations on the form document that are not associated with a document field. This enables creators of fillable digital documents to collect additional data without requiring recipients fill out additional forms.

In providing users methods of generating fillable digital documents, the database management engine 120 provides collision detection. Collision detection is a method of 1) detecting the collision (e.g., overlapping) of interface elements mapped onto an image of a form document and 2) rectifying the collision by modifying the position of one or more interface elements effected by the collision. When a collision is detected, the database management engine 120 modifies the position of one or more of the effected interface elements based on a set of predetermined rules. In some embodiments, the database management engine 120 also detects collisions between one or more interface elements and a field of the form document. For example, the database management engine 120 may detect instances in which a user overlays an interface element onto text associated with a field of the form document such that a recipient of the digital form document is unable to view some or all of the text associated with the field.

In addition, the database management engine 120 may provide suggested mappings to users based on the type of form document uploaded by the user and/or data associated with the user. To do this, the database management engine 120 identifies data associated with the form document and/or user, and makes a comparison between the identified data and form documents that have been previously mapped. Based on the comparison, the database management engine 120 may identify one or more similar documents and provide the mapping of the one or more similar documents to the user. Alternatively, or additionally, the database management engine 120 may generate an optimized mapping based on one or more similar form documents and provide the optimized mapping to the user.

The client device 110 is configured to communicate with the scanning engine 115 and database management engine 120 via a network 125, which may include any combination of local area and/or wide area networks, using both wired and/or wireless communication systems. In one embodiment, a network 125 uses standard communications technologies and/or protocols. For example, a network 125 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 125 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 125 may be represented using any suitable format, such as hypertext markup language (HTML) or extensible markup language (XML). In some embodiments, all or some of the communication links of a network 125 may be encrypted using any suitable techniques.

Figure 2:
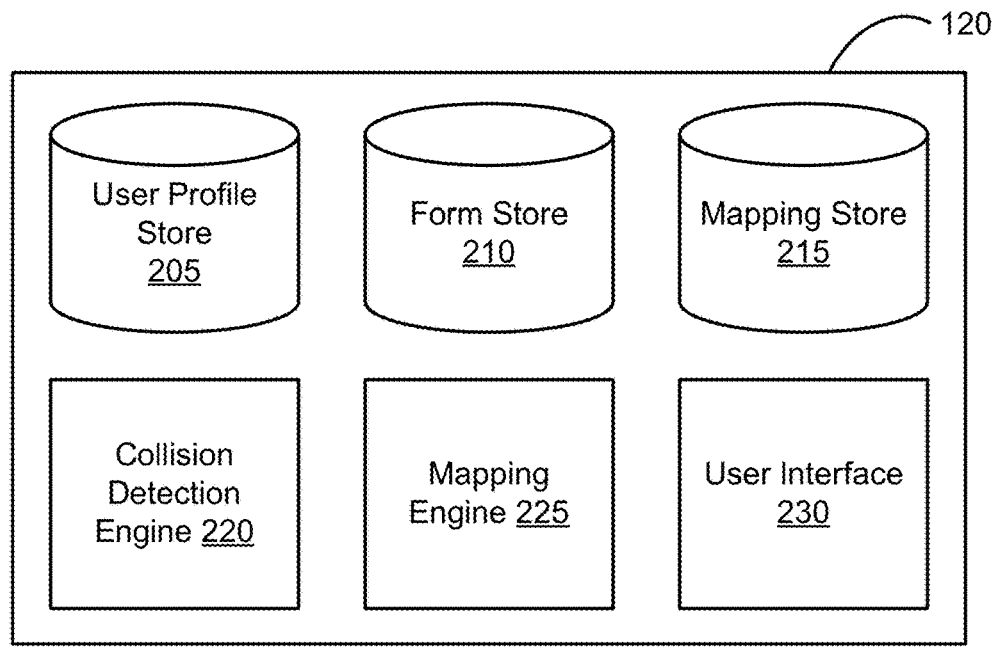
FIG. 2 is a block diagram of an architecture of the database management engine, according to one embodiment.

FIG. 2 is a block diagram of an architecture of the database management engine 120, according to one embodiment. The database management engine 120 shown in FIG. 2 includes a user profile store 205, a form store 210, a mapping store 215, a collision detection engine 220, a mapping engine 225, and a user interface 230. In other embodiments, the database management engine 120 may include additional, fewer, or different components for various applications.

The user profile store 210 stores profiles of users of the database management engine 120. Profiles may correspond to employees, employers, entities, and the like. Each profile may include declarative information about the user that was provided by the user, an employee or employer of the user, a third-party system, etc. Employee profiles may include information such as demographic information, employment history, compensation rates, employment state, employment status (active, full-time, part-time, seasonal, inactive, etc.), and the like. Employer profiles may include information such as employer location, number of employees, status of employees, incorporation location, and the like. Information stored in a profile of a user may be added when the user completes a fillable digital document. Similarly, fillable digital documents may be automatically completed or partially completed based on information stored in one or more user profiles.

The form store 210 stores complete and incomplete form documents. Form documents and images of form documents may be provided by users of the database management engine 120 via the user interface 230. Form documents may be any document that requires input from a recipient, such as tax forms, benefits forms, surveys, reviews, and the like. Form documents may be associated with one or more fields that include or are adjacent to field text and are associated with a field position. Examples of fields include name, date, wage, address, company name, company address, and the like. Fields generally include a space adjacent to the field text in which users may enter data associated with the field text.

In some embodiments, fillable digital documents are, as described herein, generated from form documents and images of form documents that are often provided in a format that recipients cannot easily add text to (e.g., pdf, png, and jpeg formats). Therefore, the form store 210 also stores fillable digital documents. Fillable digital documents are form documents that have been modified such that a recipient may digitally enter data into an image of the form document. As discussed above, fillable digital documents are generated by the database management engine 120 by converting an image of a form document and a set of interface elements that have been overlaid onto the image. Interface elements are configured to receive input (e.g., text, a signature, a box selection) from a recipient of the fillable digital document. Interface elements are often co-located with the space of a document field. Then, once a form document with an associated mapping is converted into a fillable digital document, recipients may digitally enter data into the fields of the fillable digital document. This ensures that recipients correctly complete form documents they receive. The form store 210 may also store extracted form text and entered text from form documents and fillable digital documents. Further, the form store 210 may store the location of extracted form text and entered text, metadata associated with the form documents and fillable digital documents, and the like.

Users may generate fillable digital documents by mapping interface elements onto images of form documents via the user interface 230. The set of interface elements mapped onto an image of a form document is referred to as a mapping, and includes the category and position of each interface element in the set. The category and position of an interface element designates where and what data should be entered by a recipient of the fillable digital document. A category of an interface element may be data-specific, such as an interface element for a name, address, company name, employment status of a recipient, etc. A category of an interface element may also be generic, such as an interface element for a selection box (e.g., a checkbox or radio button), entered text, and the like. Further, an interface element may be associated with a requested category or an automatic category. Requested categories require input from the recipient of the fillable digital document, such as entering text or selecting a box. Automatic categories are categories that are automatically completed using known information of the recipient, such as information stored in the user profile store 210. Automatic categories may be associated with a pointer to data stored in the user profile store. In these embodiments, the automatic categories of a fillable digital document are automatically completed based on the pointer. For example, if an interface element is associated with a company name, the company name of the recipient may be automatically entered into the corresponding interface element. Additionally, interface elements may not be associated with a category, and may instead enable a recipient of the fillable form document to decide what data to enter.

The mapping store 215 stores mappings generated by users of the database management engine 120 and mappings generated by the mapping engine 225. A mapping stored by the mapping store 215 may include the category and position of each interface element associated with the mapping. The mapping may further include the document field and the position of the document field each interface element is mapped to, the position of the interface element relative to the document field position, a comparison between the document field text and the category of the interface element, and the like. For example, mapping information for a company name interface element may include 1) the category of the company name interface element (e.g., "company name"), 2) whether the company name interface element may be automatically completed using information in a recipients profile, 3) whether the company name interface element is co-located with a company name field, 4) the position of the company name interface element relative to the field text of the company name field, 5) whether the field text of the document field is the same/similar to the category associated with the company name interface element, 6) the coordinates and/or relative position of the company name interface element and document field, and the like. The mapping store 215 may also store information about the type of document associated with the mapping, information about the user who generated the mapping, when the mapping was generated, recipient data, and the like.

The collision detection engine 220 monitors the mapping of interface elements on form documents to detect interface element collisions. Interface element collisions may occur when a user places an interface element within a threshold distance of another interface element. For example, a collision may occur when two interface elements are overlapping, when the boundaries of interface elements touch, and the like. The collision detection engine 220 rectifies the collision by modifying the position of one of the effected interface elements. The collision detection engine 220 may modify the position of an interface element based on a set of rules. Rules may include modifying the position of the interface element such that it is located at the shortest possible distance from its original location, modifying the position of the interface elements in a particular order relative to the image of the form document (e.g., left to right and/or top to bottom), modifying the position based on a semantic analysis of the categories associated with the interface elements, modifying the position based on an optimization analysis performed on the position of the interface elements, and the like.

In some embodiments, the collision detection engine 220 may also identify interface elements that have been placed within a threshold distance to form text of the form document (e.g., overlapping form text). In these embodiments, the form text of the document and the corresponding locations of the form text may be identified by performing an optical character recognition analysis on the image of the form document using the scanning engine 115 and/or software with similar functionality to the scanning engine 115 that is integrated into the database management engine 120. The collision detection engine 220 may modify the position of an interface element until it is separated from the form text by at least the threshold distance based on the identified location of the form text. The collision detection engine 220 may also modify the position of an interface element based on a semantic analysis of the form text and the category associated with the interface element. For example, a user may map a first name interface element onto a form document. However, instead of placing the interface element at a position co-located with a first name field of the form document, the user places the interface element at a position co-located with an address field. Based on a semantic analysis of the interface element category and document fields, the collision detection engine 220 may modify the position of the first name interface element to be co-located with the first name field instead of the address field. In some embodiments, a semantic analysis of interface elements and form text is performed in response to a detected collision. In other embodiments, it is automatically performed by the database management engine 120 in response to the placement of an interface element onto the form document.

The mapping engine 225 suggests mappings of interface elements to users generating fillable digital documents. The mapping engine 225 may do this when it detects that a user has uploaded a form document (or an image of a form document) that is similar to a form document that has been previously mapped. For example, if a user uploads a tax form, the mapping engine 225 may identify one or more fillable digital documents that have been generated using the same or similar tax form. Based on a similarity between the form document uploaded by the user and the form documents associated with the one or more fillable digital documents, the mapping engine 220 may identify a candidate document. The mapping engine 225 may also identify a candidate document based on data of the user who uploaded the form document, users associated with each of the one or more fillable digital documents that were generated using the same or similar form document, a comparison between the form text of a candidate document and the form text of an uploaded document, a comparison of visual similarity between the documents, and the like. In response, the mapping engine 225 may provide the set of interface elements associated with the candidate document to the user as a suggested mapping between the set of interface elements of the candidate document and the fields of the document uploaded by the user.

Alternatively, or additionally, the mapping engine 225 may generate and suggest mappings based on the set of interface elements associated with two or more candidate documents. The mapping engine 225 may do this by aggregating the set of interface elements associated with two or more candidate documents. For example, the mapping engine 225 may identify which interface elements are common among the mappings of similar documents, average the positions of common interface elements across the two or more candidate documents, perform an optimization analysis on the form documents and the interface elements associated with each of the form documents, and the like, to generate a suggested mapping.

Further, the mapping engine 225 may identify types of fields of an uploaded document based on identified fields of similar documents. Based on the identified field types of the uploaded document, the database management engine 120 may auto-populate the uploaded document using information stored in the user profile store 205.

Through elements of the user interface 230, the user may accept the suggested mapping, decline the suggested mapping, and/or modify the suggested mapping based on user preferences. For example, a user may modify the position of the interface elements in the set, add or remove interface elements, adjust the size and/or shape of interface elements, and the like. In some embodiments, when the mapping engine 225 provides a mapping to a user, the mapping engine 225 may prompt the user to explicitly confirm the placement of the interface elements onto the image of the form document. For example, the user may be prompted to explicitly confirm that the set of interface elements of a suggested mapping is placed onto the image of the form document, explicitly confirm the placement of each interface element individually, explicitly confirm the category of each interface element individually, and the like.

The user interface 230 allows users to interact with the database management engine 120. Through various elements of the user interface 230 (such as graphical user interfaces displayed by a client device, communicative interfaces with other components described herein managed by the user interface, and the like), a user can update and/or generate user profiles, form documents, and mappings. Users may also manage form document recipients, mapping generation, collision detection, and the like.

FIG. 3 is an example user interface 300 for uploading documents, according to one embodiment. To generate a fillable digital document, users may upload form documents via a user interface 230 of the database management engine 120. A first user interface, such as a user interface 300 for uploading documents, may identify details of the document and user upon upload. These details may be used by the database management engine 120 to identify a suggested mapping, suggested recipient, and the like. Document details may include document type, document size, number, type, document fields, position of document fields, and the like. The database management engine 120 may obtain document details by performing an optical character recognition analysis on the image of the form document (e.g., using the scanning engine 115 and/or software with similar functionality integrated into the database management engine 120). User details may include author, location, company, job status, and the like. User details may be obtained from data in a profile of the user stored in the user profile store 205.

As shown in FIG. 3, the user interface 300 for uploading documents includes an image of the uploaded form document 305 and a set of interface elements 309 that are configured to be mapped onto the image of the form document 305. The set of interface elements 309 are displayed within a portion of the user interface 300 displayed to the user. The user may then drag and drop interface elements from the portion of the user interface with the set of interface elements 309 onto the portion of the user interface 300 with the image of the form document 305 (e.g., at positions co-located with document fields). As shown, the form document 305 includes multiple fields, such as the Employee Identification Number field 310. Fields may include or be adjacent to form text, such as "Employee Identification Number," and may include a space for a recipient of the form to enter text associated with the field, such as space 311. As discussed above, users may place interface elements onto the space 311 such that recipients of the fillable digital document may digitally enter data into document fields.

The interface elements in the set of interface elements 309 are used to designate regions of the form document in which data may be entered. The set of interface elements 309 may include requested categories 315 and automatic categories 320. Requested categories are categories that require input from the recipient of the fillable digital document. Examples of requested categories include, but are not limited to a signature category 325, a text category 330, an initials category 335, a checkbox category 340, an admin signature category 345, an admin title category 350, and an admin full name category 355. Automatic categories are categories that are automatically filled using data stored in the user profile store 210. Examples of automatic categories include, but are not limited to, a date category 360, a company name category 365, a first name category, a last name category, a full name category, an email category, a hire date category, a date of birth category, a social security number (SSN) category, an address line 1 category, an address line 2 category, a city category, a state category, and a zip code category. Automatic categories may be associated with a pointer to data stored by the database management engine 120 such that the categories are automatically filled based on the pointer. If data associated with an automatic category is not stored in the user profile store 210, the recipient may be prompted to manually enter data associated with the automatic category. Users may place interface elements at each field that has a corresponding interface element. Further, users may modify the shape and size of the interface elements such that the interface elements fit within the spaces of the document fields. Once the user has finished mapping interface elements onto the image of the form document, the image of the form document and set of mapped interface elements are saved as a fillable digital document. Users may proceed to a subsequent user interface using the save and continue button 370. Alternatively, users may proceed to a previous user interface using the back button 375.

Collision Detection

FIGS. 4A-4B illustrate an example process of collision detection, according to one embodiment. Through a map document interface 400, a user may map one or more interface elements onto an image of a form document 405. In some embodiments, a user maps an interface element by dragging and dropping the interface element onto the image of the form document. As previously discussed, when two or more interface elements are mapped within a threshold distance of each other, or when they overlap, the collision detection engine 220 automatically modifies the position of one or both of the two or more interface elements such that the interface elements are separated by at least a threshold distance.

As shown in FIG. 4A, a user mapped the city interface element 415 within a threshold distance of the address line 1 interface element 420. The collision detection engine 220 detects this collision by identifying the position of each interface element within the image of the form document. The collision detection engine 220 may determine a collision has occurred if the positions of the interface elements are within a threshold distance of each other, or if a portion of the positions of the respective interface elements are within a threshold distance of each other.

As shown in FIG. 4B, once a collision is detected, the collision detection engine 220 automatically modifies the position of one or more of the interface elements until the interface elements are separated by at least a threshold distance. In some embodiments, the position of the most recently added interface element is modified, the position of the first interface element is modified, the positions of all effected interface elements are modified, and the like.

The position of an interface element may be modified based on a set of rules determined by the database management engine 120 and/or a user of the database management engine 120. Rules may include rules for modifying the position of the interface element such that it is located at the shortest possible distance from its original location, modifying the position of the interface elements in a particular order relative to the image of the form document 405 (e.g., left to right and/or top to bottom), and the like. The collision detection engine 220 may also modify the location of an interface element based on a semantic analysis of the categories associated with the interface elements. For example, the collision detection engine 220 may determine that an address line 1 interface element 420 should be placed to the left or on top of a city interface element 415 based on a rule specifying that the "address line 1" category generally appears before the "city" category. Further, the collision detection engine 220 may modify the position of an interface element based on form text of the form document. The collision detection engine 220 may do this based on an optical character recognition analysis and/or semantic analysis of the form text of the form document.

As an example, the collision detection engine 220 may detect that a user placed an interface element with a "city" category at a position co-located with a state field. The collision detection engine 220 may detect that the form document includes a city field, and modify the position of the city interface element to be at a position co-located with a city field. If the form document does not include the city field, the collision detection engine 220 may modify the location of the city interface element based on a semantic analysis of the terms "city" and "state." Accordingly, the collision detection engine 220 may modify the position of the city interface element so that it is to the left of or above state field. Alternatively, or additionally, the collision detection engine 220 may notify the user that an interface element has been placed onto the image of the form document that is not associated with a field of the form document.

Additionally, the collision detection engine 220 may detect that a user placed an interface element on the form document such that the interface element overlaps with form text. For example, the collision detection engine 220 may detect that a user placed a social security number interface element over field text associated with an employee identification number field 310. In response, the collision detection engine 220 automatically modifies the position of the social security number interface element so that the social security number interface element is 1) not overlapping with field text of the employee identification number field 310, and/or 2) at a position co-located with a social security number field, if such a field exists on the image of the form document. The collision detection engine 220 may also modify the size and shape of an interface element. The collision detection engine 220 may do this if an interface element is placed within a threshold distance of a related document field, but covers a threshold portion of field text. For example, a user may place an address line 1 interface element 420 over the field text of the employee's address and ZIP code field 425. The collision detection engine 220 may determine that the category of the address line 1 interface element 420 is correlated with the employee's address and ZIP code field 425. The collision detection engine may then reposition the address line 1 interface element 420 to be within a threshold distance of the field text and co-located with an empty space of the employee's address and ZIP code field 425.

Figure 5:
FIG. 5 illustrates an example preview user interface, according to one embodiment.

FIG. 5 illustrates an example preview user interface 500, according to one embodiment. Once a user has completed her mapping of interface elements onto the image of the form document 505, the user may preview the fillable digital document that is generated from the conversion of the image of the form document and the mapped interface elements. The preview may include example data entered into each of the mapped interface elements. For example, the preview user interface 500 includes a selected radio button 510 and an unselected radio button 515, a sample address in the employee's address and zip code field 520, a sample signature in the signature field 525, and a sample date in the date field 530. The preview may allow users to verify the placement of interface elements onto the image of the form document. In some embodiments, the user may add, remove, and/or edit interface elements from the preview user interface 500. In alternative embodiments, the user may need to proceed to a subsequent user interface to add, remove, and/or edit interface elements.

FIG. 6 illustrates an example recipient user interface 600, according to one embodiment. The recipient user interface 600 allows users to select one or more recipients of the fillable digital document. A user may individually select recipients using interface elements associated with all eligible recipients, such as interface element 605. A user may also select all eligible recipients 610, select recipients by filtering recipients based on data of the recipients, such as department, location, company, position, employment status, and the like. Further, the database management engine 120 may suggest one or more recipients to the user based on the form document, the contents of the form document, and/or the user. The database management engine 120 may also suggest recipients that are required to fill out the form document, but haven't; users that directly report to the user who created the fillable digital document; users that have recently updated data in their profile that is associated a pointer of an interface element of the form document; users that have historically been selected together, etc. For example, if the form document is a W-4 form, the database management may identify new hires, employees with changed benefit statuses, and the like, that need to complete the W-4 form. A user may also be able to generate groups of recipients using one or more interface elements of the recipient user interface 600. Once a user has selected one or more recipients, the user may send the fillable digital document to the one or more recipients using an interface element, such as the submit button 615. Alternatively, the user may exit from the recipient user interface 600 without sending the fillable digital document using an alternative interface element, such as the exit button 620.

Figure 7:
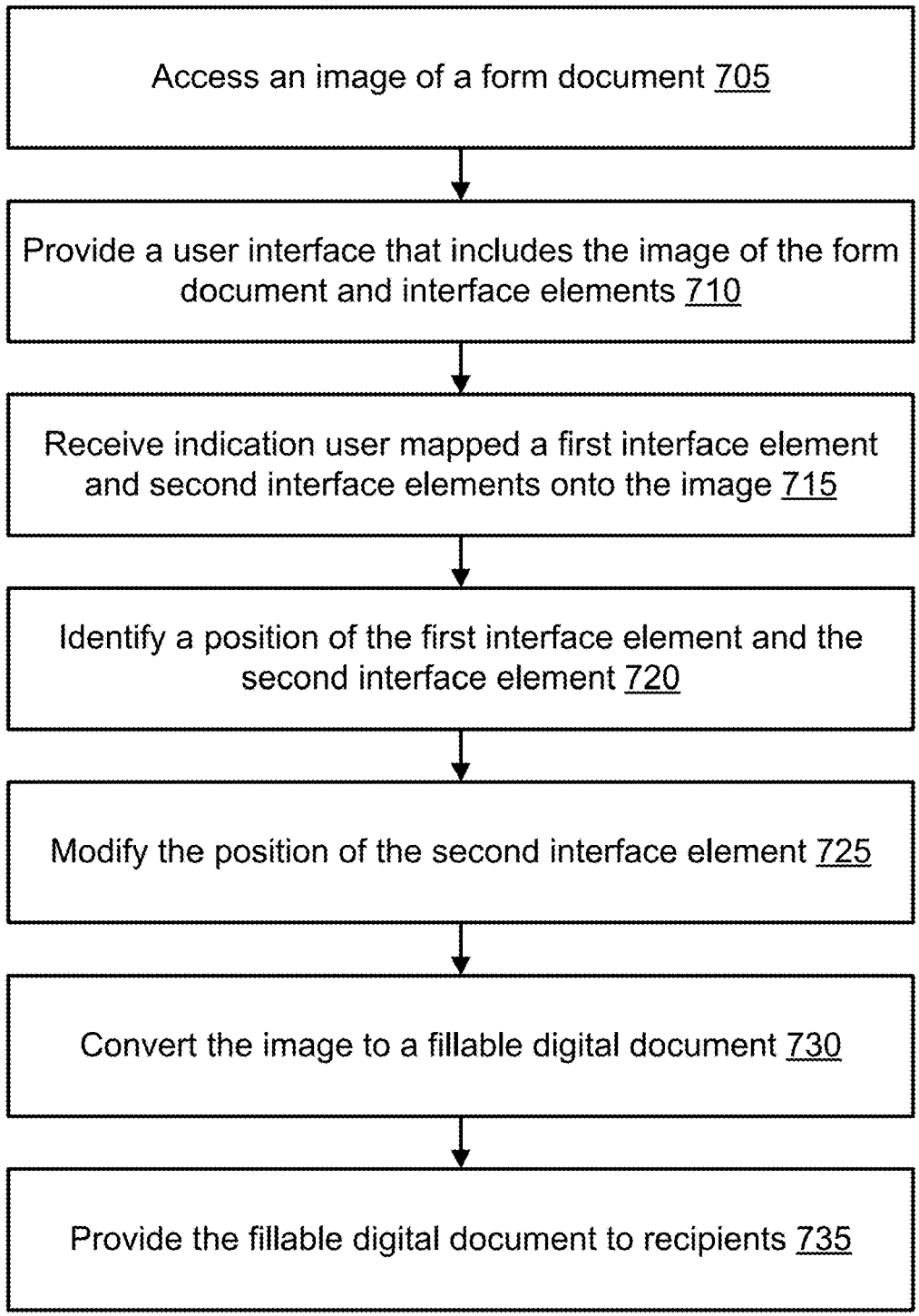
FIG. 7 is a flowchart illustrating a method of providing collision detection on a form document, according to one embodiment.

FIG. 7 is a flowchart illustrating a method 700 of providing collision detection on an image of a form document, according to one embodiment. In the method 700 shown, an image of a form document is accessed 705. A user interface that includes the image of the form document and a plurality of interface elements is provided 710 on a user device of a user. Each of the plurality of interface elements is associated with a category (e.g., last name, first name, signature, date, company name) and is configured to be mapped onto the image of the form document in association with a field of the form document. An indication is received 715 that the user mapped a first interface element and a second interface element onto the image of the form document. A first position of the first interface element and a second position of the second interface element are identified 720 within the image of the form document.

In response to determining 1) the first position and the second position overlap at least in part, or 2) a portion of the first position is within a threshold distance of a portion of the second position, the second position of the second interface element is modified 725 within the image of the form document. The second position of the second interface element may be modified such that each portion of the first position and each portion of the second position are separated by the threshold distance. For example, a portion of a boundary of the first interface element may overlap with a portion of a boundary of the second interface element. In response, the position of the second interface element may be modified such that each portion of the boundary of the first interface element and each portion of the boundary of the second interface element are separated by at least a threshold distance.

The image of the form document is converted 730 into a fillable digital document, in which the first interface element is at the first position and the second interface element is at the modified second position. The fillable digital document is provided 735 to one or more recipients, where the recipients are each associated with a profile in a human resource database, such as the user profile store 215 of the database management engine 120. The one or more recipients may then add text to the first interface element and/or second interface element.

Suggested Mappings of Interface Elements Based on Similar Documents

FIG. 8 illustrates a suggested mapping prompt 800, according to one embodiment. As previously discussed, when a user uploads a new form document, the mapping engine 225 may identify previously mapped form documents that are similar to the new form document. The mapping engine 220 may identify similar documents based on data stored in the form store 210 and the user profile store 205. From the identified similar documents, the mapping engine 220 may select a candidate document based on a similarity between the candidate document and the new form document. The mapping associated with the candidate document is provided to the user. The database management engine 220 may allow the user to accept and/or reject the suggested mapping. For example, if the user wants to proceed with the suggested mapping, the user may select the proceed button 810. Similarly, if the user does not want to proceed with the suggested mapping, the user may select the cancel button 810.

FIG. 9 illustrates a suggested mapping user interface 900, according to one embodiment. When a suggested mapping is provided, the interface elements associated with the mapping are placed onto the image of the form document 905, such as the company name interface element 910 and the employee first name interface element 915. Users may add additional interface elements from the set of interface elements 920, edit interface elements, and/or remove interface elements from the mapping. In some embodiments, modified mappings generated by the user are stored in the mapping store 215. Modified mappings may be used by the mapping engine 225 to update previously stored mappings and/or generate new mappings. Once the user has completed the mapping, the user may proceed to a subsequent interface to convert the form document and mapping into a fillable digital document, preview a completed version of the fillable digital document, and forward the fillable digital document to one or more recipients.

Figure 10:
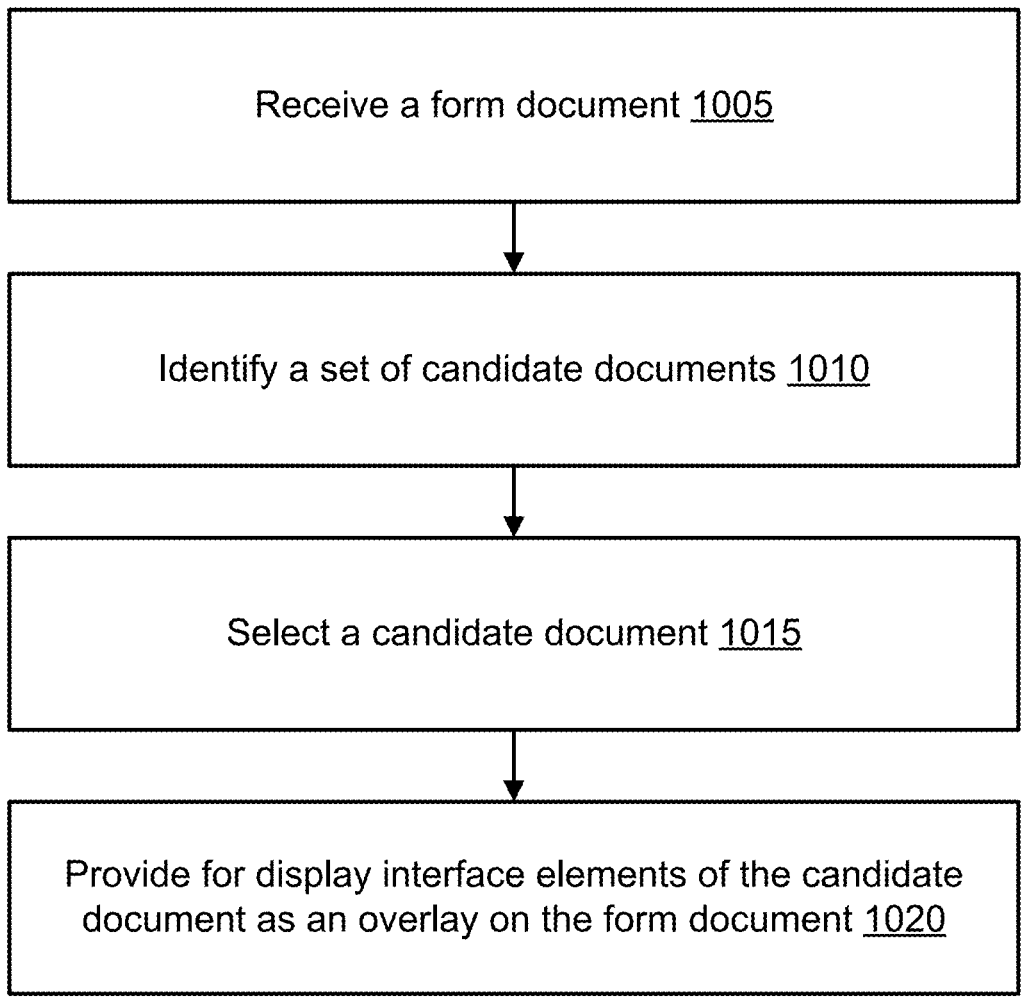
FIG. 10 is a flowchart illustrating a method of automating interface element placement on an image of a form document, according to one embodiment.

FIG. 10 is a flowchart illustrating a method 1000 of automating element placement on a form document, according to one embodiment. A form document including a first set of fields is received 1005. Each field in the first set of fields is associated with a field type (e.g., name, employment type, company name, etc.) and a field position (e.g., top, middle, bottom, position coordinates, etc.) within the form document. A set of candidate documents is identified 1010, for instance by selecting documents that have previously been uploaded by the user that uploads the form document, by selecting documents that are semantically similar to or that include a threshold amount of common text with the form document, by selecting documents that have an above-threshold amount of visual similarity to the form document, and the like. Each candidate document in the set of candidate documents is associated with a second set of fields and a set of interface elements. Each field in the second set of fields is associated with a field type and field position within the candidate document. Interface elements may include interface elements that have been overlaid onto the candidate document by a user of the candidate document. Further, each interface element is associated with a field in the second set of fields.

A candidate document is selected 1015 based on a similarity between the candidate document and the form document. In some embodiments, a candidate document is selected by comparing the field type of each field in the first set of fields to the field type of each field in the second set of fields associated with each candidate document. A candidate document associated with the greatest number of fields in common with the form document may be selected. In some embodiments, field types may be compared by performing a semantic analysis on the field type of each field in the first set of fields and the field type of each field in the second set of fields associated with each candidate document. Further, the field position of each field in the first set of fields and the field position of each field in the second set of fields associated with each candidate document may be compared. A candidate document with the greatest number of fields in common and in a common position with the form document may be selected.

In some embodiments, a candidate document is selected based on data associated with a user that uploaded the form document and the users associated with each of the candidate documents. Similarly, a candidate document may be selected based on data associated with the form document and data associated with each of the candidate documents.

The form document and the set of interface elements associated with the selected candidate document is provided 1020 for display on a user interface of a user device. The interface elements are provided 1020 as a suggested overlay on the form document such that when an overlaid interface element is selected by a user, the interface element is mapped to a corresponding field of the first set of fields within the form document. In some embodiments, when the form document and the set of interface elements associated with the selected candidate document is provided 1020 for display, the user is prompted to explicitly confirm a mapping between each interface element and the form document. Once explicit confirmation is received from the user, the interface element is provided as an overlay on the displayed form document. This allows users to select which interface elements from the set of interface elements of the selected candidate document are mapped to fields within the form document. Once a user has completed a mapping, the form document and interface elements of the mapping are converted into a fillable digital document. The fillable digital document may then be sent to one or more recipients.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving a form document including a first set of fields, each field of the first set of fields associated with a field type and field position within the form document;
   selecting a candidate document from a set of candidate documents based on 1) a similarity between the candidate document and the form document, 2) a similarity between a user that provided the form document and users associated with the set of candidate documents, and 3) a comparison of a visual similarity between the form document and each of the set of candidate documents;
   providing for display, on a user interface of a user device, the form document and a set of interface elements associated with the selected candidate document as an overlay on the form document within an interface that allows the user to add additional interface elements for overlay on fields of the form document, to remove interface elements from the mapping, and to edit interface elements overlaid on the form document; and
   generating a mapping between the selected candidate document and the form document, the mapping comprising associations between overlaid interface elements and the corresponding fields of the first set of fields within the form document, the mapping further including any added interface elements, not including any removed interface elements, and including any edits made by the user to interface elements.

2. The method of claim 1, wherein selecting the candidate document comprises:
   comparing the field type of each field in the first set of fields to field types of each field in each candidate document; and
   selecting the candidate document associated with a greatest number of fields in common with the form document.

3. The method of claim 2, wherein comparing comprises:
   performing a semantic analysis on the field type of each field in the first set of fields and the field type of each field in each candidate document, and
   comparing the field position of each field in the first set of fields and the field position of each field in each candidate document; and
   wherein selecting the candidate document comprises selecting the candidate document with the greatest number of fields in common and in a common position with the form document.

4. The method of claim 1, further comprising modifying the form document based on the generated mapping to produce a modified form document.

5. The method of claim 1, further comprising:
   performing a semantic analysis on the field types of each field in the first set of fields and a category of each interface element in the set of interface elements associated with the selected candidate document; and
   modifying the overlay of the form document based on a result of the semantic analysis.

6. The method of claim 1, wherein the form document is associated with a first entity, wherein each candidate document in the set of candidate documents is associated with a third-party entity, and wherein selecting the candidate document further comprises:
   accessing data associated with the first entity and data associated with each of the third-party entities;
   performing a similarity analysis on the data associated with the first entity and the data associated with each of the third-party entities; and
   selecting the candidate document based on a result of the similarity analysis on the data associated with the first entity and the data associated with each of the third-party entities.

7. A non-transitory computer-readable storage medium containing computer program code that, when executed by a processor, causes the processor to perform steps comprising:
   receiving a form document including a first set of fields, each field of the first set of fields associated with a field type and field position within the form document;
   selecting a candidate document from a set of candidate documents based on 1) a similarity between the candidate document and the form document, 2) a similarity between a user that provided the form document and users associated with the set of candidate documents, and 3) a comparison of a visual similarity between the form document and each of the set of candidate documents;
   providing for display, on a user interface of a user device, the form document and a set of interface elements associated with the selected candidate document as an overlay on the form document within an interface that allows the user to add additional interface elements for overlay on fields of the form document, to remove interface elements from the mapping, and to edit interface elements overlaid on the form document; and generating a mapping between the selected candidate document and the form document, the mapping comprising associations between overlaid interface elements and the corresponding fields of the first set of fields within the form document, the mapping further including any added interface elements, not including any removed interface elements, and including any edits made by the user to interface elements.

8. The non-transitory computer-readable storage medium of claim 7, wherein selecting the candidate document comprises:

comparing the field type of each field in the first set of fields to field types of each field in each candidate document; and selecting the candidate document associated with a greatest number of fields in common with the form document.

9. The non-transitory computer-readable storage medium of claim 8, wherein comparing comprises:

performing a semantic analysis on the field type of each field in the first set of fields and the field type of each field in each candidate document, and comparing the field position of each field in the first set of fields and the field position of each field in each candidate document; and wherein selecting the candidate document comprises selecting the candidate document with the greatest number of fields in common and in a common position with the form document.

10. The non-transitory computer-readable storage medium of claim 7, wherein the program code, when executed by the processor, causes the process to modify the form document based on the generated mapping to produce a modified form document.

11. The non-transitory computer-readable storage medium of claim 7, wherein the program code, when executed by the processor, causes the processor to perform further steps comprising:

performing a semantic analysis on the field types of each field in the first set of fields and a category of each interface element in the set of interface elements associated with the selected candidate document; and modifying the overlay of the form document based on a result of the semantic analysis.

12. The non-transitory computer-readable storage medium of claim 7, wherein the form document is associated with a first entity, wherein each candidate document in the set of candidate documents is associated with a third-party entity, and wherein selecting the candidate document further comprises:

accessing data associated with the first entity and data associated with each of the third-party entities;

performing a similarity analysis on the data associated with the first entity and the data associated with each of the third-party entities; and selecting the candidate document based on a result of the similarity analysis on the data associated with the first entity and the data associated with each of the third-party entities.

13. A system comprising:

a hardware processor; and a non-transitory computer-readable medium containing instructions that, when executed by the hardware processor, cause the hardware processor to:

receiving a form document including a first set of fields, each field of the first set of fields associated with a field type and field position within the form document;

selecting a candidate document from a set of candidate documents based on 1) a similarity between the candidate document and the form document, 2) a similarity between a user that provided the form document and users associated with the set of candidate documents, and 3) a comparison of a visual similarity between the form document and each of the set of candidate documents;

providing for display, on a user interface of a user device, the form document and a set of interface elements associated with the selected candidate document as an overlay on the form document within an interface that allows the user to add additional interface elements for overlay on fields of the form document, to remove interface elements from the mapping, and to edit interface elements overlaid on the form document; and generating a mapping between the selected candidate document and the form document, the mapping comprising associations between overlaid interface elements and the corresponding fields of the first set of fields within the form document, the mapping further including any added interface elements, not including any removed interface elements, and including any edits made by the user to interface elements.

14. The system of claim 13, wherein selecting the candidate document comprises:

comparing the field type of each field in the first set of fields to field types of each field in each candidate document; and selecting the candidate document associated with a greatest number of fields in common with the form document.

15. The system of claim 14, wherein comparing comprises:

performing a semantic analysis on the field type of each field in the first set of fields and the field type of each field in each candidate document, and comparing the field position of each field in the first set of fields and the field position of each field in each candidate document; and wherein selecting the candidate document comprises selecting the candidate document with the greatest number of fields in common and in a common position with the form document.

16. The system of claim 13, further containing instructions that cause the hardware processor to:

perform a semantic analysis on the field types of each field in the first set of fields and a category of each interface element in the set of interface elements associated with the selected candidate document; and modify the overlay of the form document based on a result of the semantic analysis.

17. The system of claim 13, wherein the form document is associated with a first entity, wherein each candidate document in the set of candidate documents is associated with a third-party entity, and wherein selecting the candidate document further comprises:

accessing data associated with the first entity and data associated with each of the third-party entities;

performing a similarity analysis on the data associated with the first entity and the data associated with each of the third-party entities; and selecting the candidate document based on a result of the similarity analysis on the data associated with the first entity and the data associated with each of the third-party entities.

18. The system of claim 13, further containing instructions that cause the hardware processor to modify the form document based on the generated mapping to produce a modified form document.

* * * * *